July 8, 1941.  J. K. WOOD  2,248,447
SPRING DEVICE
Filed Jan. 17, 1939  2 Sheets-Sheet 1

INVENTOR
JOSEPH KAYE WOOD
BY
ATTORNEYS

July 8, 1941.  J. K. WOOD  2,248,447
SPRING DEVICE
Filed Jan. 17, 1939   2 Sheets-Sheet 2

INVENTOR
JOSEPH KAYE WOOD
BY
ATTORNEYS

Patented July 8, 1941

2,248,447

UNITED STATES PATENT OFFICE 2,248,447

SPRING DEVICE

Joseph Kaye Wood, Bronx, N. Y., assignor to General Spring Corporation, New York, N. Y., a corporation of New York Application January 17, 1939, Serial No. 251,329

10 Claims. (Cl. 267—1)

This invention relates to spring devices and parts thereof and more particularly to such devices in which coil springs are connected by plugs, and to special plugs adapted for connecting coil springs.

It is an object of my invention to produce a spring device and an end-plug for use in spring devices, which may be easily assembled, which is secure against accidental separation, and which may be easily adjusted.

It is another object of my invention to produce a plug which can be easily and quickly secured and which may be easily removed without destroying the spring.

It is another object of my invention to produce such a plug which may be used in nested extension springs.

In the past the use of extension springs has been hindered by the difficulty of securing such springs to their loads and to their anchorages. The most common method has been to bend up the end of the spring to provide a loop for attaching to the load or anchorage. However, this method introduces strains in the last convolution of the spring which are much greater than the strain in the active convolutions. This has been the cause of many failures in extension springs and has led designers to use compression springs even where extension springs would be more suitable.

A second method of anchoring extension springs in the past has been to use a solid end-plug which is threaded on its outer periphery with a groove corresponding to the spiral of the spring whereby it is screwed into the end of the spring. The use of these solid end-plugs eliminates the objection of excess strain in the end convolution but is extremely difficult of assemblage. It is found in practice that these solid end-plugs must be of extremely accurate dimensioning and that even then many springs are ruined because of end-plugs which after being partially inserted into the spring can neither be fully inserted nor removed. Once these end-plugs are in the springs it is impossible to remove them, as any attempt to turn them out causes the spring to wind tighter around the plug and bind it in place.

These difficulties are intensified in nested extension springs where the outer and inner end-plugs must be connected together and yet be adjustable so that initial tension on both springs can be controlled.

According to my present invention the end-plug may be assembled in or upon any spring without the use of any extreme force. It makes the assembly of nested extension springs extremely simple and eliminates all the disadvantages hitherto found in the attachment of extension springs.

Figure 1:
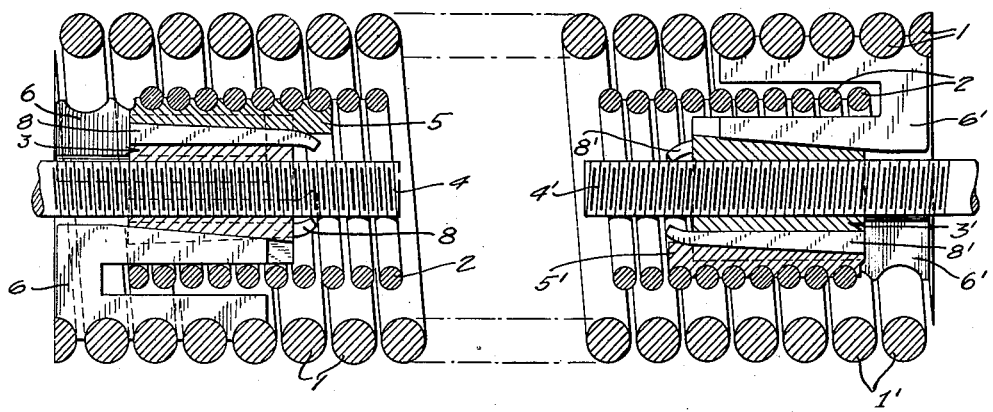
Fig. 1 shows a view in section of a nested extension spring unit embodying the special end-plugs of my invention.
Figure 2:
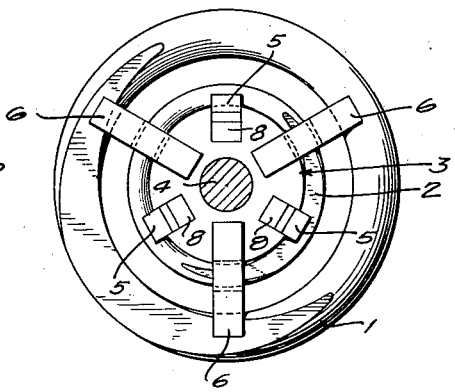
Fig. 2 shows an end view of the same unit as Fig. 1.

In Figs. 1 and 2, I have shown a main spring 1 and a smaller concentric spring 2 held between the end-plugs 3 and 3' which are tapped to fit the left and right hand screw threaded rods 4' and 4, which go to the anchorage and to the load or such other apparatus parts with which the spring is to be used.

The inner spring 2 is held by the keys 5 which are set at 120° apart around the periphery of the end-plug 3. These keys are transversely grooved on their outer face to correspond to segments of the convolutions of the spring and successive keys have the grooves advanced one-third of the pitch of the spring so that each is aligned spirally along the thread of the spring when each is in its proper angular position. It is advantageous to roughen or knurl the surface of some or all of the grooves, preferably those which engage the last two convolutions of the spring, so as to produce better adhesion between the spring and the keys.

The tension of one of the concentric springs relative to the other may be adjusted by interchanging the keys. Shifting the keys one slot around the plug gives an increase or decrease in the stretch equal to one-third of the pitch of the spring convolutions. Thus, it is possible to very closely adjust the length of the spring. If even closer adjustment is desired the keys may be moved to the exact position and secured there by applying the wedges 8 into engagement. Thus, the length of the spring may be changed by an amount less than the pitch of one convolution of the spring.

The outer spring is held by the U-shaped key members 6 which fit into the keyways intermediate of the keyways previously mentioned for the inner spring and are provided with inclined wedge faces as shown.

In order to make the assembly, the plug 3 is inserted in the inner spring 2 and the keys 5 are fitted in place in the first set of keyways. Then the U-shaped key members 6 are inserted in the second set of keyways; and holding the connector plug 3, the wedge keys 6 are driven in to tight engagement in the keyways and with the spring at the same time centering the plug in the spring. The keys 5 are then adjusted to give the desired relation between the two springs and the wedges 8 are driven home. Due to the curved faces on the keys 5 and the plug 3 at the end of the wedge space, the end of the wedges 8 are bent over when they are driven in and thus are secured against coming out. Following this the screw threaded rods 4 and 4' may be turned into the end-plugs and the assembly is complete.

Figure 3:
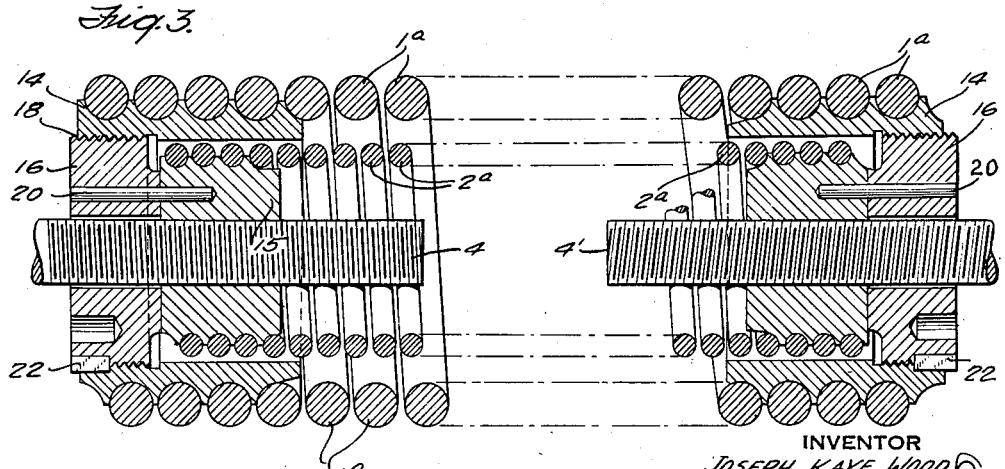
Fig. 3 shows a view in section of a nested extension spring unit assembled according to my invention.

In Fig. 3, I have shown an assembly of a modified form of nested spring turnbuckle in which separate plugs are shown with an adjustable connector member between. The plugs 14 and 15 are screwed into the springs 1a and 2a respectively. As shown, the plug 14 is hollow, and internally threaded to receive the connecting member 16. The plug 15 for the inner spring is of the usual solid plug construction and is externally grooved to receive the spring, and internally threaded to receive the rod.

The connecting member 16 is drilled to such size as to freely pass the rod 4 and is keyed to the plug 15 by the pin 20 and to the plug 14 by the pin or "Dutchman" 22.

To assemble this spring, the end-plugs 14 and 15 are put in place in the inner and outer springs respectively in the usual manner. Thus, the small spring is slipped into the larger one, and the connecting member 16 is screwed into the thread 18 in the outer plug 14. One or the other of the connecting members 16 is turned until the proper relationships exist between the two springs as to length and tension. Then a hole is drilled through the member 16 and partly into the inner plug 15, and a pin 20 is inserted so as to tie the plug 15 with the connecting member 16. This leaves the connecting member free to turn on the thread of 14, and in order to prevent this a drill is made into the thread 18, and a pin 22, commonly known as a "Dutchman" inserted. This rigidly connects the inner and outer plugs and the connecting member together, and prevents the relationship between the plugs from changing. After the assembly is complete at both ends of the spring, the right and left hand screws 4 and 4' respectively are inserted in their respective inner plugs 15, and by using the outer spring as a grip, the entire assembly acts as a turnbuckle by which the tension of the spring can be adjusted.

Figure 4:
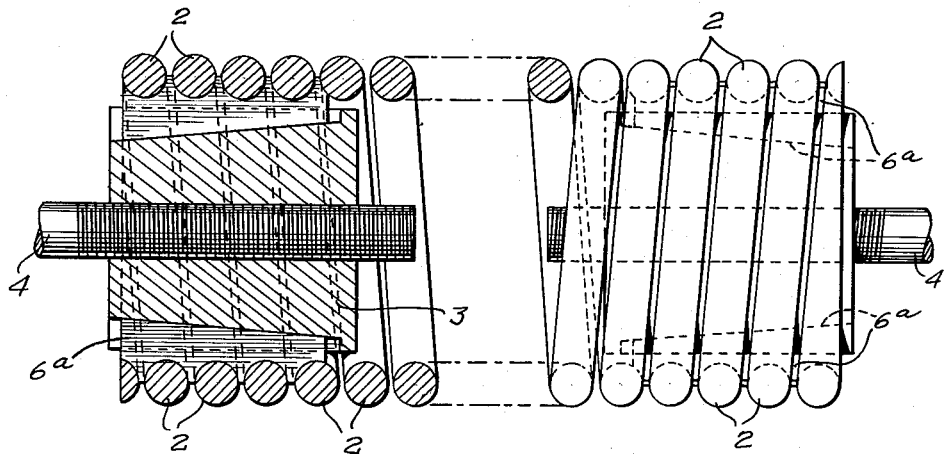
Fig. 4 shows a view partly in section and partly in elevation embodying end-plugs according to my invention used in a single extension spring.

In Fig. 4, I have shown a detail of one of my plugs adapted for use in a single expansion spring. In this form I have omitted the wedges 8 and used the wedging effect of the keys 6a alone. The plug 3a in this case is made with a number, for example 3, of inclined keyways. Into these keyways the keys 6a slide so that, when a pull is exerted on the spring through the plug, the keys are forced against the convolutions of the spring grasping them tightly.

Figure 5:
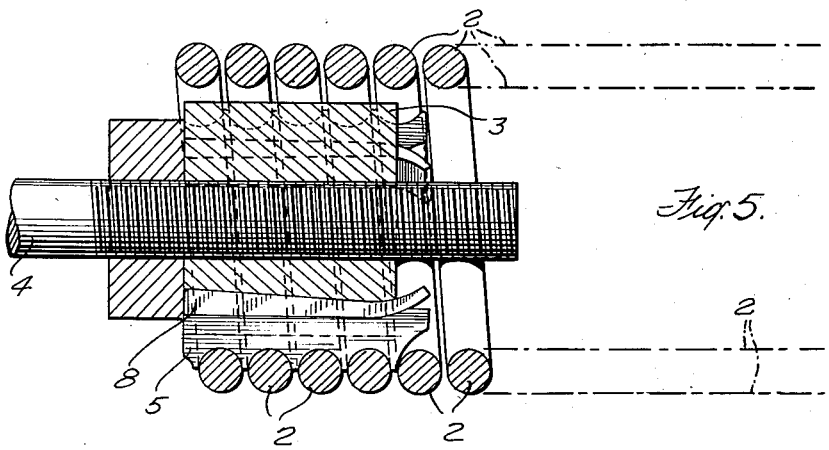
Fig. 5 shows a detail of an end-plug using equilizing wedges.

In order to adjust the keys and to keep the threaded plug centered on the axis of the spring, ductile tapered wedges 8 may be inserted between the keys 5 and the plug 3b in the keyways as in the case illustrated in Fig. 1. This is shown more particularly in Fig. 5, in which the wedges 8 respectively are driven in during the assembly of the spring and the plug in order to center and align the plug. As shown, the end of the wedge is bent around the inside end of the plug, thereby locking the plug body and the keys together. Obviously, numerous other ways of holding these wedges may be used instead, and in fact they will ordinarily be held adequately by friction alone.

Figure 6:
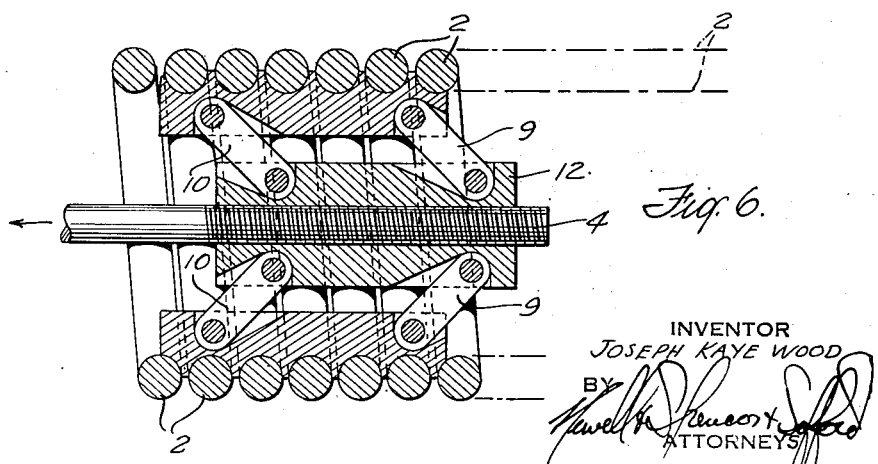
Fig. 6 shows an alternative form of such a plug using toggles.

In Fig. 6, I have shown another form of my invention, in which the keys are attached to the plug 12 by a pair of levers 9 and 10. These levers provide a simple toggle action. Any pull on the rod 14 results in a force which presses the keys tighter against the spring. It is obvious, of course, that in this case if the tension is removed entirely from the spring the wedges will come free of the spring and the entire plug assembly can be quickly removed.

What I claim is:

1. A nested coil extension spring assembly which comprises a plurality of concentric extension springs, a plug for at least one end of said springs, said plug being smaller in diameter than the internal diameter of the innermost of the concentric springs and said plug having a plurality of wedge engaging faces on its outer periphery running longitudinally of the plug, keys provided with wedge engaging faces corresponding to those of said plug, a portion of said keys having transverse grooves on their outer faces adapted to receive and engage the end convolutions of the inner spring, and the remaining keys being extended radially beyond the first-named group and having grooves in said extended portions adapted to receive and engage the end convolutions of the larger spring, and wedges between the keys and plug engaging said faces and pressing the keys into secure engagement with the spring and whereby said plug may be adjusted in position with regard each spring, and thereby the position of the spring may be adjusted relative one another.

2. An end-plug assembly for nested inner and outer coil extension springs which comprises attaching means for connecting the assembly to other apparatus, and a plurality of engaging means between each of said springs and the attaching means, one set of said engaging means being brought into engagement with the inner spring and another set with the outer spring, and each set being adapted to convert a force tending to extend the spring into a pressure against the respective spring for tighter engagement therewith.

3. An end-plug assembly for a nested extension spring as defined in claim 2, in which the set of engaging means which engages the outer spring consists of a plurality of U-shaped members, the outer surface of one leg of the U being adapted to engage the inside of the spring, and the outer surface of the other leg of the U being tapered and the attaching means having keyways to receive these tapered engaging means.

4. A coil spring assembly which comprises a coil spring, means for connecting said spring to other apparatus, said means being centered so as to maintain the line of stress coaxial with the coil spring, and a plurality of wedges distributed about the axis of the spring and spaced apart less than 180° for simultaneously engaging said spring and the connecting means and holding them in said centered relation, said engaging means being adapted to be tightened in their engagement with the spring and the attaching means by their reaction to a force tending to deflect the spring.

5. An end-plug assembly for a coil spring which comprises means for connecting said spring to other apparatus, and engaging means for simultaneously engaging said spring and the connecting means, said engaging means comprising a plurality of members adapted to engage the inside of convolutions of the spring and toggle means acting between the connecting means and the engaging means, whereby to press the engaging means against the spring when a force tending to extend the spring is applied.

6. An end-plug for securing a spring to other apparatus which comprises connecting means having a member extending within said spring prrovided with faces adapted to be engaged by wedges, segmental members each adapted to engage the inside of a segment of at least one convolution of the spring and having on its opposite side a face adapted to be engaged by a wedge, the last-mentioned faces being paired respectively with the wedge engaging faces of the connecting means and each pair being at an angle such that they converge in the direction of the force exerted by the spring and each pair being respectively curved off in the same direction at the closest ends thereof, and a wedge adapted to fit the space between each pair of faces and having an end of thickness not greater than the space between the curved faces and adapted to be bent around said faces when the wedge is driven into position and to resist restraightening by forces which would be exerted thereon when in use.

7. An end-plug for securing a spring to other apparatus which comprises connecting means having a member extending within said spring provided with faces adapted to be engaged by wedges, segmental members each adapted to engage the inside of a segment of at least one convolution of the spring and having on its opposite side a face adapted to be engaged by a wedge, the last-mentioned faces being paired respectively with the wedge engaging faces of the connecting means and each pair being at an angle such that they converge in the direction of the force exerted by the spring, and a wedge adapted to fit the space between each pair of faces.

8. A spring assembly as defined in claim 1, in which the keys comprise outer members transversely grooved on their outer faces to fit segments of convolutions of the spring, and intermediate wedges adapted to be driven between the wedge-engaging faces of the plug and said outer members whereby to expand the latter into engagement with the spring with the plug in any of a limited range of adjustments axially with respect to the spring.

9. A spring assembly which comprises a coil spring, means adapted to connect the assembly to other apparatus parts, a plurality of segmental means distributed about the axis of the spring, each spaced less than 180° from the next and adapted to engage respectively similarly spaced segmental portions of convolutions of said spring and means for converting a pull on the connecting means into a force having a radial component acting on said segmental means to press them into more secure engagement therewith.

10. A nested coil spring turnbuckle assembly which comprises a pair of coil springs, one inside the other, threaded connectors at opposite ends of the spring and having respectively right and left hand threads, means engaging the end convolutions of the respective ends of the springs and for locking them to the threaded connectors at the same end, whereby a turn of the spring will turn simultaneously both threaded connectors with a turnbuckle action, and at least one of the engaging means being adjustable axially of the spring with relation to the threaded connector and its means for locking adapted to lock it in any position of a substantial adjustment range, whereby one spring in said combination may be adjusted relative to the other.

JOSEPH KAYE WOOD.